(12) United States Patent
Steinwender

(10) Patent No.: US 7,461,731 B2
(45) Date of Patent: *Dec. 9, 2008

(54) MAGNETORHEOLOGIC CLUTCH

(75) Inventor: Herbert Steinwender, Raaba (AT)

(73) Assignee: Magna Drivetrain AG & Co KG, Lannach (AT)

( * ) Notice: Subject to any disclaimer, the term of this patent is extended or adjusted under 35 U.S.C. 154(b) by 0 days.

This patent is subject to a terminal disclaimer.

(21) Appl. No.: 12/025,273

(22) Filed: Feb. 4, 2008

(65) Prior Publication Data

US 2008/0142328 A1    Jun. 19, 2008

Related U.S. Application Data

(63) Continuation of application No. 10/532,379, filed as application No. PCT/AT03/00328 on Oct. 31, 2003, now Pat. No. 7,325,663.

(30) Foreign Application Priority Data

Oct. 31, 2002  (AT) ............................... 739/2002 U

(51) Int. Cl.
F16D 37/02  (2006.01)
F16D 35/00  (2006.01)
(52) U.S. Cl. ................. 192/21.5; 192/58.41; 188/267.1
(58) Field of Classification Search ............... 188/267.1
See application file for complete search history.

(56) References Cited

U.S. PATENT DOCUMENTS

| 2,685,947 A | 8/1954 | Votrian |
| 2,983,349 A | 5/1961 | Meiklejohn |
| 5,823,309 A | 10/1998 | Gopalswamy et al. |
| 5,845,753 A | 12/1998 | Bansbach |
| 5,896,965 A | 4/1999 | Gopalswamy et al. |
| 5,967,273 A | 10/1999 | Hampton |
| 6,183,386 B1 | 2/2001 | Duggan |
| 7,325,663 B2 * | 2/2008 | Steinwender ............... 192/21.5 |

* cited by examiner

*Primary Examiner*—Richard M. Lorence
(74) *Attorney, Agent, or Firm*—Harness, Dickey & Pierce, P.L.C.

(57) ABSTRACT

A magnetorheological clutch comprises a stationary part (1), of a rotatable primary part (2) with primary lamellae (3) and of a secondary part (8) with secondary lamellae (17) which surrounds the primary part (2), there being formed between the primary part (2) and the secondary part (8) a space (28) which contains a magnetorheological fluid, a regulatable magnetic field acting on the magnetorheological fluid. In order to have as small a build as possible, to be capable of transmitting a maximum torque with minimum current and to be easily controllable, at least one magnet coil (21) is arranged in front of or behind the lamellae (4, 17) in the axial direction and loops around a first U-shaped yoke (20), the two end faces (26) of which are on the same side of the lamellae and parallel to these, at least one second yoke (22) is on the side of the lamellae which faces away from the first yoke (20), and the regions of the secondary part (8) which lie inside and outside the lamellae (4, 17) in the radial direction consist of a material of low magnetic permeability.

27 Claims, 8 Drawing Sheets

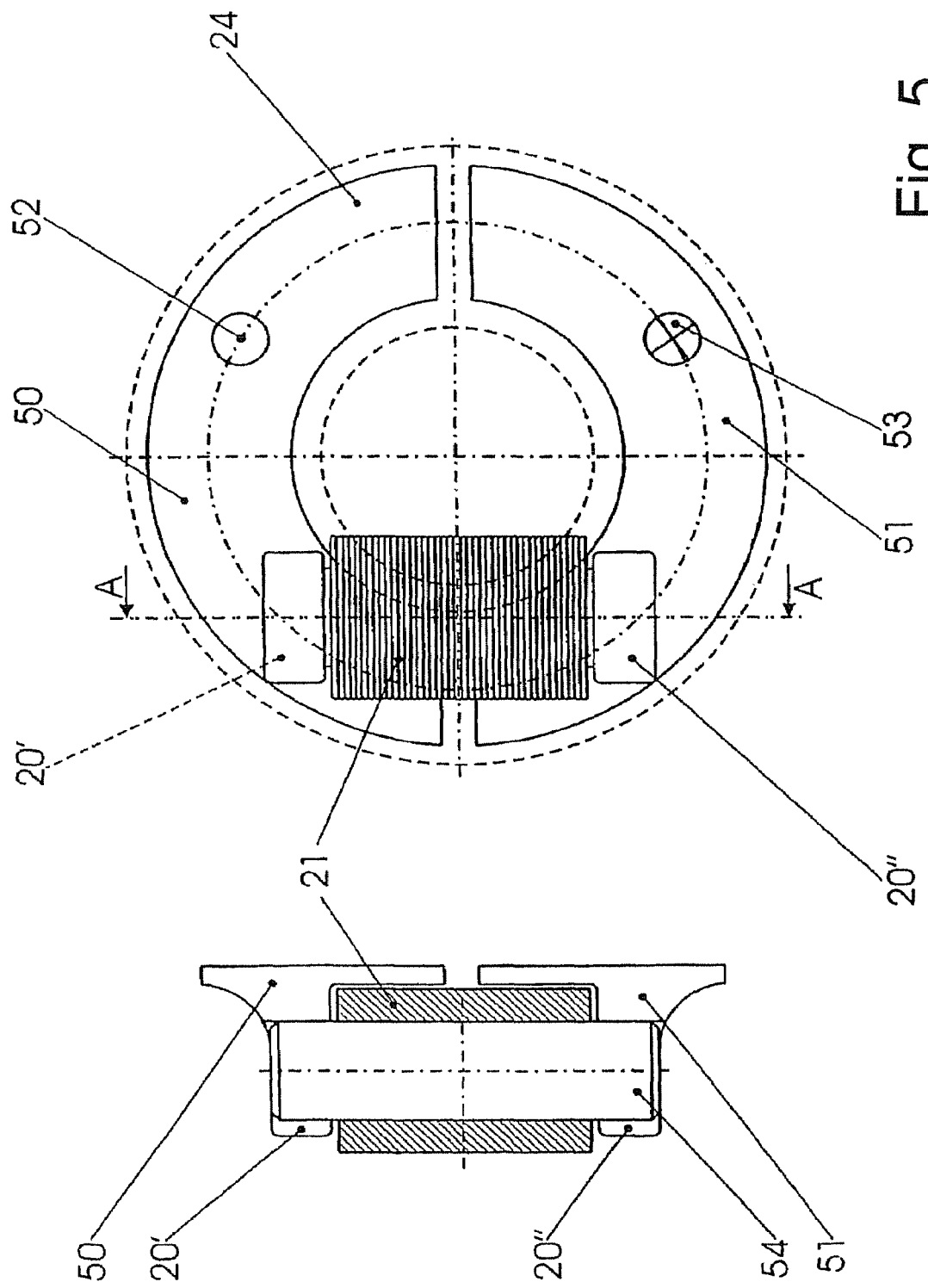

MAGNETORHEOLOGIC CLUTCH

CROSS-REFERENCE TO RELATED APPLICATIONS

Figure 1:
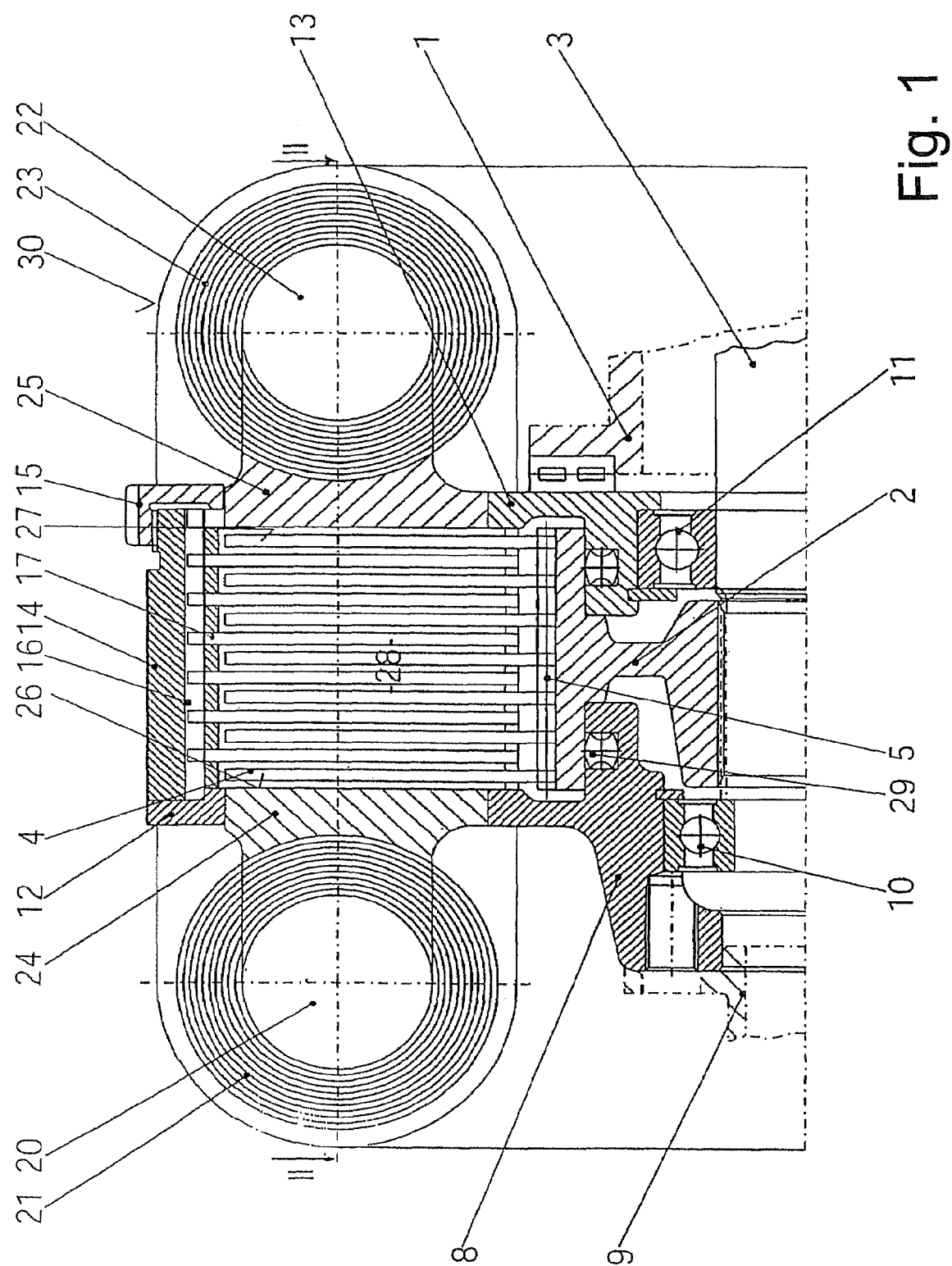

This is a continuation application of U.S. patent application Ser. No. 10/532,379 filed Apr. 21, 2005, now U.S. Pat. No. 7,325,663, which is a National Stage of International Application No. PCT/AT2003/000328 filed Oct. 31, 2003, which claims the benefit of GM 739/2002 filed Oct. 31, 2002. The disclosures of the above applications are incorporated herein by reference.

BACKGROUND

The statements in this section merely provide background information related to the present disclosure and may not constitute prior art.

The invention relates to magnetorheological clutches which consist of a stationary part, a rotatable primary part with primary lamellae, and a secondary part with secondary lamellae which is rotatable about a common axis and surrounds the primary part, there being formed between the primary part and the secondary part a space which contains a magnetorheological fluid and in which primary lamellae and secondary lamellae alternate in the axial direction, and a magnet coil generating a magnetic field of regulatable field strength which acts on the magnetorheological fluid.

However, for the use of a generic clutch in the drive train of a motor vehicle, current consumption and overall size are critical and must therefore be minimized. In addition to this, there are also further requirements: such as a wide regulating range of the transmitted torque that, on the one hand, provide slip-free starting from standstill and, on the other hand, (also for reasons of noise), complete separation are possible; and, finally, a rapid response in order to be compatible with electronic drive dynamics controls (ESB, ABS, etc.).

Thus, U.S. Pat. No. 5,845,753 discloses a generic clutch, in which the yokes extend from one end face on one side of the clutch, so as to surround this on the outside, as far as a second end face on the other side of the clutch. This not only increases the diameter and weight, but also means a large mass to be magnetized, thus consuming a large amount of current and resulting in the reduction of the magnetic field (disengagement) lasting too long for a usable control. Moreover, the magnetic force lines which pass through the space filled with the magnetorheological fluid are of low density and are distributed highly unevenly.

The object of the invention is, therefore, to provide a magnetorheological clutch which avoids the disadvantages of the prior art and satisfies the above-specified requirements of the modern motor vehicle. The magnetorheological clutch should have as small a size as possible, particularly in diameter, be capable of transmitting a maximum torque with minimum current consumption, and yet be easily controllable.

SUMMARY

According to the invention, at least one magnet coil is arranged in front of or behind the lamellae in the axial direction, that is to say approximately on the same radius as these, said magnet coil looping around a first U-shaped yoke, the two end faces of which are on the same side of the lamellae and parallel to these and are largely adjacent to the lamellae, at least one second yoke is provided on the side of the lamellae which faces away from the first yoke, and the regions of the secondary part which lie inside and outside the lamellae in the radial direction consist of a material of low magnetic permeability.

The U-shaped yokes (there will, in practice, always be a plurality of these) cause a deflection of the magnetic field along the shortest possible path and with a minimal iron volume to be magnetized. This results in a minimal dead weight and low magnetic resistances. Moreover, the magnet coils which loop around only the U-shaped yokes can be of very small design, because a specific number of turns is required for a specific magnetic field strength, which, in the case of the small diameter of the magnet coils, means short coil wire lengths and a lower ohmic resistance. Since the magnet coils lie outside the clutch, there is a better discharge of heat.

The magnet coils lie in front of and behind the lamellae, and therefore the outside diameter of the clutch is determined by the diameter of the lamellae. The second yokes arranged on the other side of the bundle of lamellae close the magnetic filed lines, so that the magnetic field lines, already short per se, pass twice through the bundle of lamellae, that is to say are "double-acting". With the corresponding arrangement of the magnet coils, the field is highly dense and uniform over the entire area of the bundle of lamellae. The parts of the secondary part which consist of a material of low magnetic permeability prevent a dispersion of the magnetic field.

Overall, therefore, the highest possible effective magnetic field strength is obtained, along with the lowest possible current consumption also operable for the low-voltage on-board network of a motor vehicle, and along with a minimal overall size. A magnetic flux density of above 0.7 [T] (=tesla) can be achieved. Moreover, the transmittable torque can be increased by a rise in the number of lamellae, without any appreciable enlargement of the clutch. In purely mechanical terms, however, the latter is large if only because of the large diameter of the lamellae lying outside the magnet coil.

For a further improvement in the profile of the field lines, and depending on practical requirements (installation dimensions, torque requirement), the cross section of the first U-shaped yokes may be increased toward the end face, and the second yoke may be a flat body running in the circumferential direction and be surrounded by no magnet coil. If the second yoke is also of U-shaped design and is surrounded by a magnet coil, a symmetrical field with a particularly high field line density is obtained.

In an advantageous embodiment of the invention, the at least one first U-shaped yoke is connected to the secondary part and the end face of the first yoke forms the boundary wall of the space containing the magnetorheological fluid. The magnet coils thus rotate together with the secondary part. This avoids the need for any air gap, which means a minimization of the magnetic losses. The second yoke then likewise rotates together with the secondary part, irrespective of whether it is designed to be U-shaped with a magnet coils or to be flat and without a magnet coil. In this case, an electrical brush connection is necessary for supplying the electrical current to the magnet coils.

In an alternative advantageous embodiment of the invention, the first U-shaped yokes are connected to the stationary part and their end faces are adjacent to an annular region of the secondary part, the permeability of which region is high, in contrast to the majority of the secondary part. There is therefore no need for a brush connection, at the expense of an air gap which, however, can be kept very small by virtue of the arrangement according to the invention. The second yokes may be designed likewise.

In a variant of the embodiment with the first yoke in the stationary part, however, the second yokes may also be designed without a specific magnet coil in the secondary part otherwise consisting of a material of low permeability, since they then do not need any current supply and can rotate together with the secondary part. They are then either designed as flat bodies running in the circumferential direction or integrated directly into the secondary part.

The number of first and second yokes can be selected according to requirements. In practice, for reasons of symmetry, there will be at least two; if there are more, then there will be even multiples of two for polarity reasons. In an advantageous arrangement, their axes lie tangentially in an axially normal plane. The legs of the yokes then lie on the same radius, thus making it easier to distribute the end faces over the annular area of the lamellae. The legs of the yokes could also be alternately on different radii if the densest possible packing on the annulus of the lamellae is to be achieved without a widening of the feet.

In a development of the enlarged end face of the yokes, the end faces of the yokes are widened to form contact faces which almost adjoin one another and the inner and outer radius of which corresponds essentially to that of the lamellae. The entire annular area of these is then utilized. The fact that the annular sectors only almost adjoin one another, that is to say do not touch one another, is for reasons of polarity. It is particularly beneficial if an even number of magnet coils succeed one another in a polarity such that adjacent legs of their U-shaped yokes form a common end face. This may be so both on one and on both sides of the bundle of lamellae. They are then polarized in such a way that field lines running through the two opposite yokes form a closed curve.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 2:
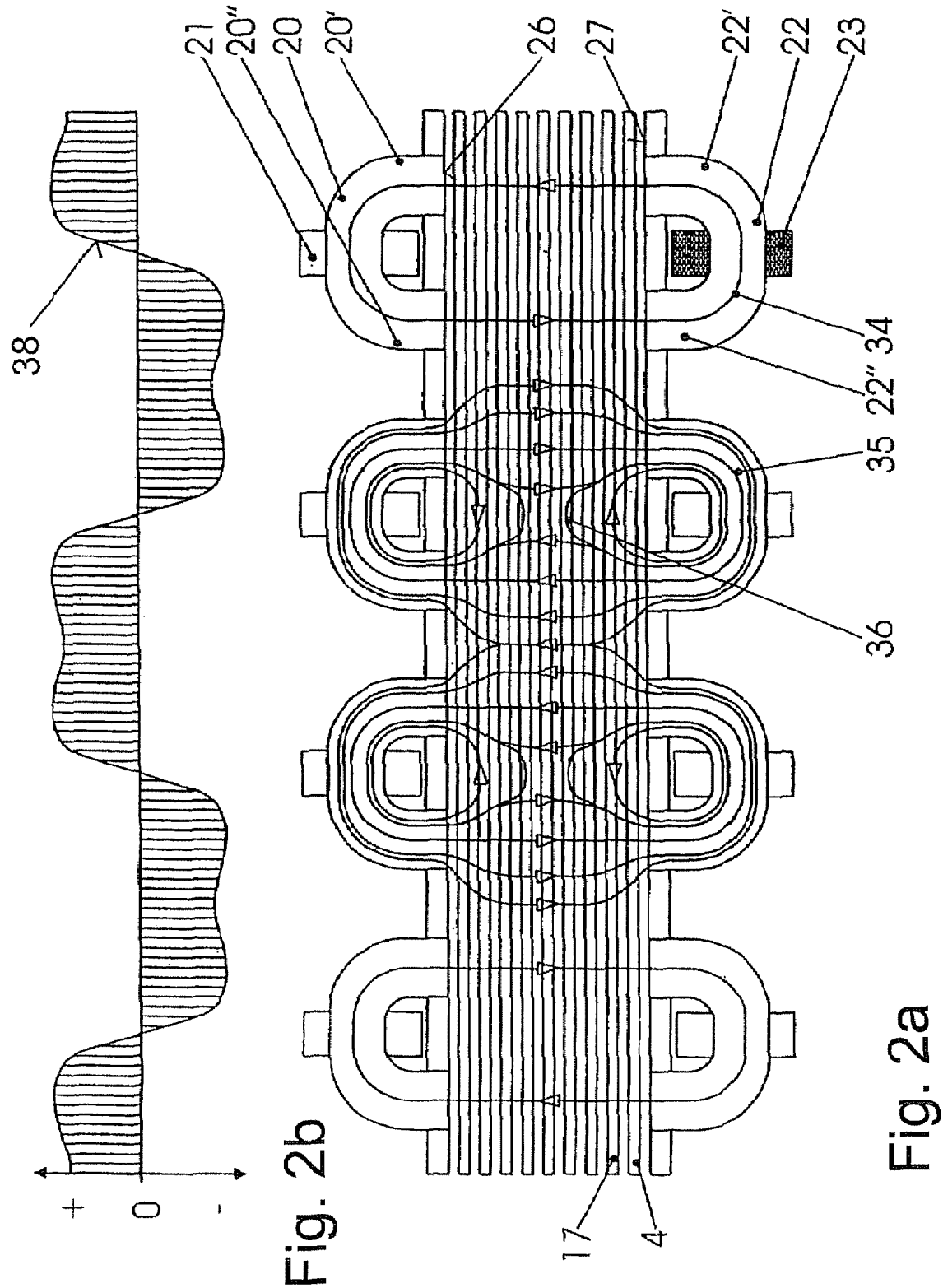
Figure 3:
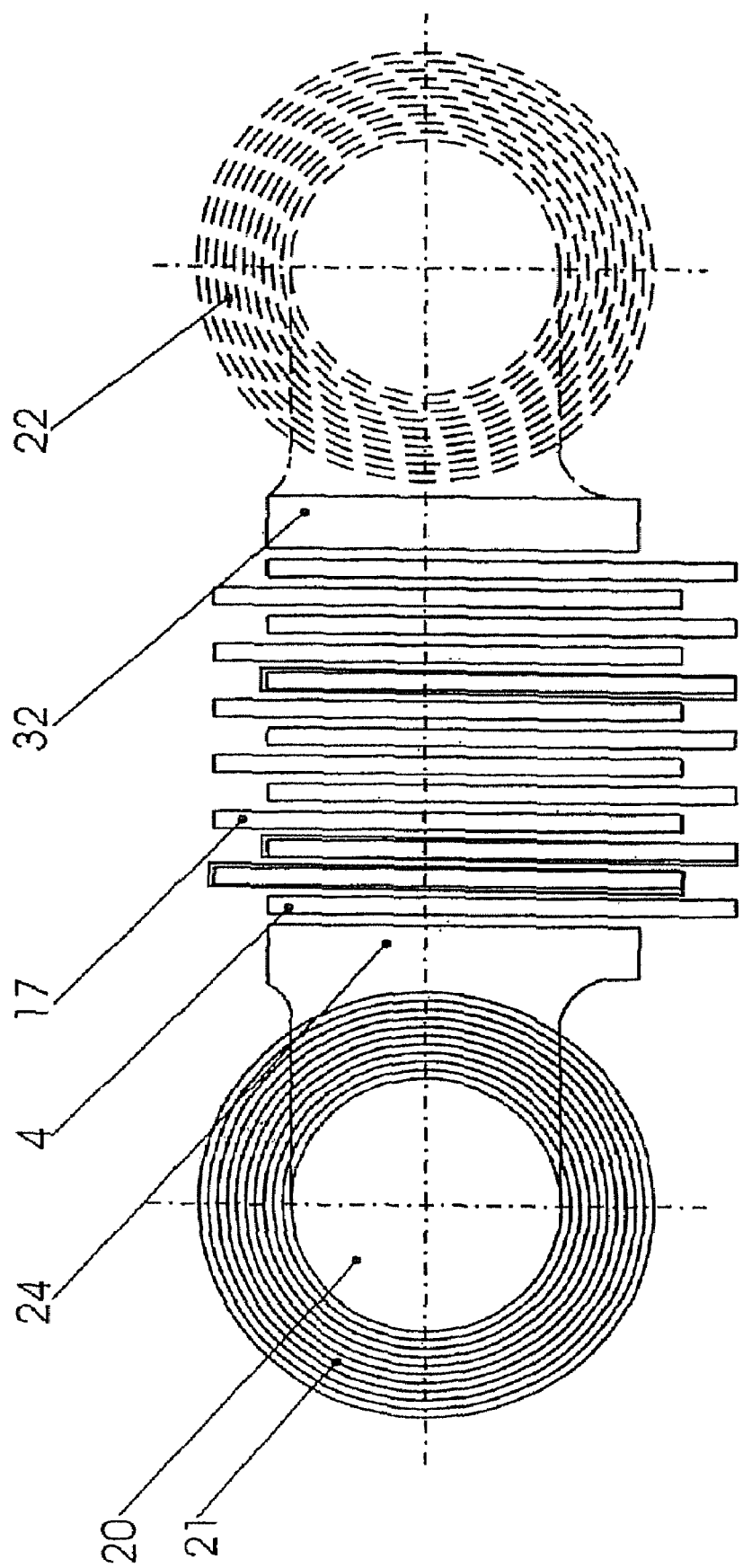
Figure 4:
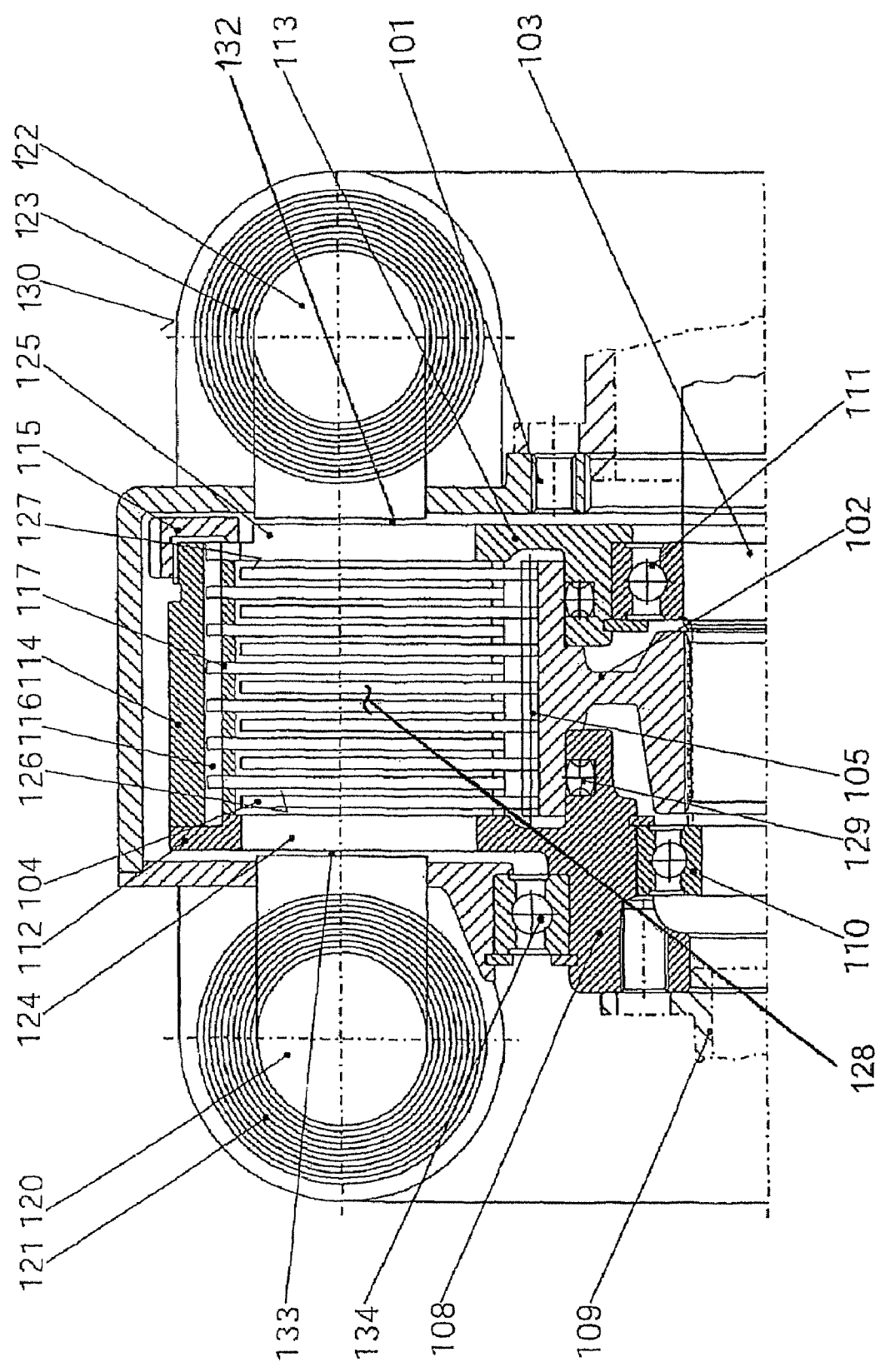
Figure 7:
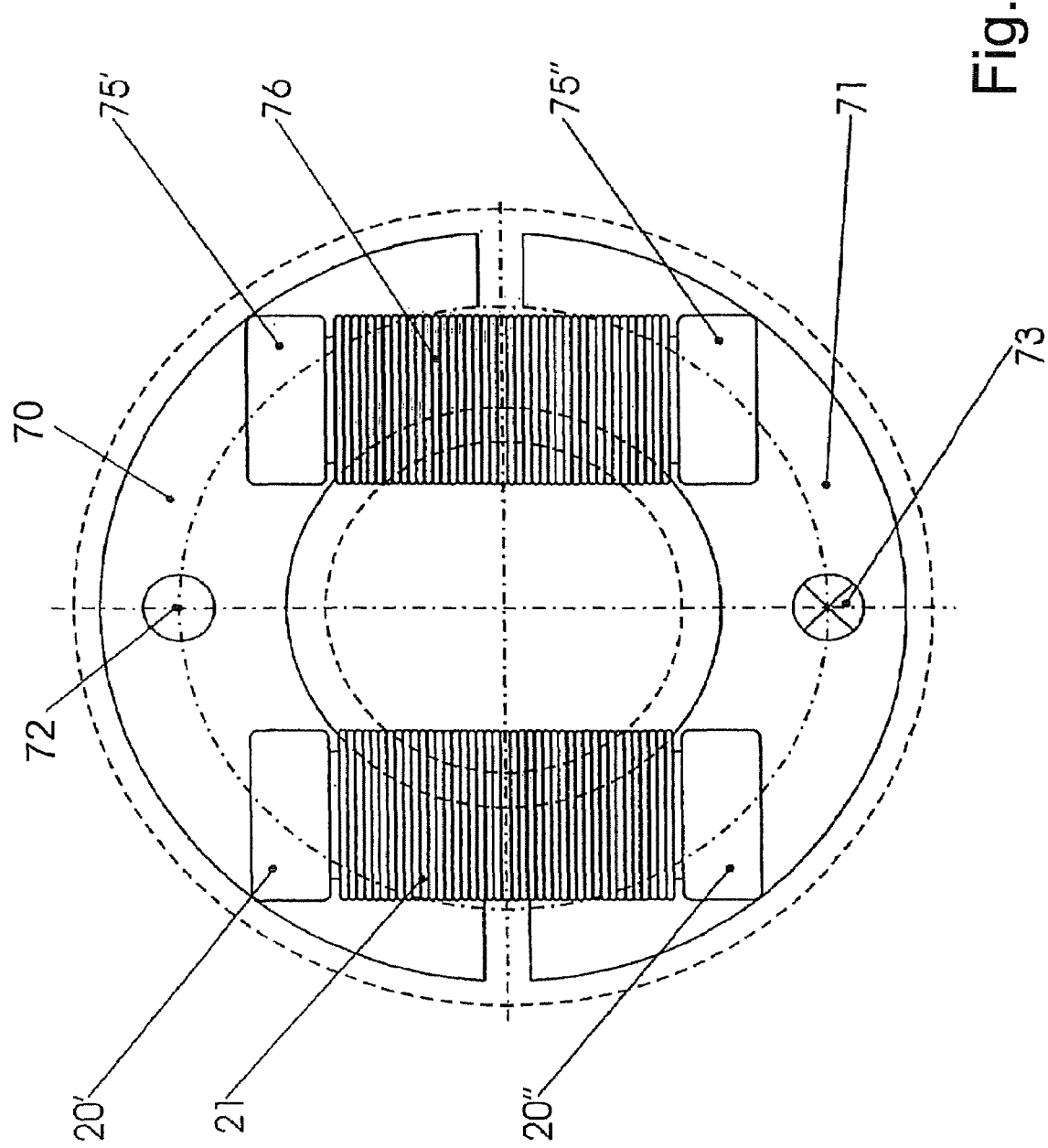
Figure 8:
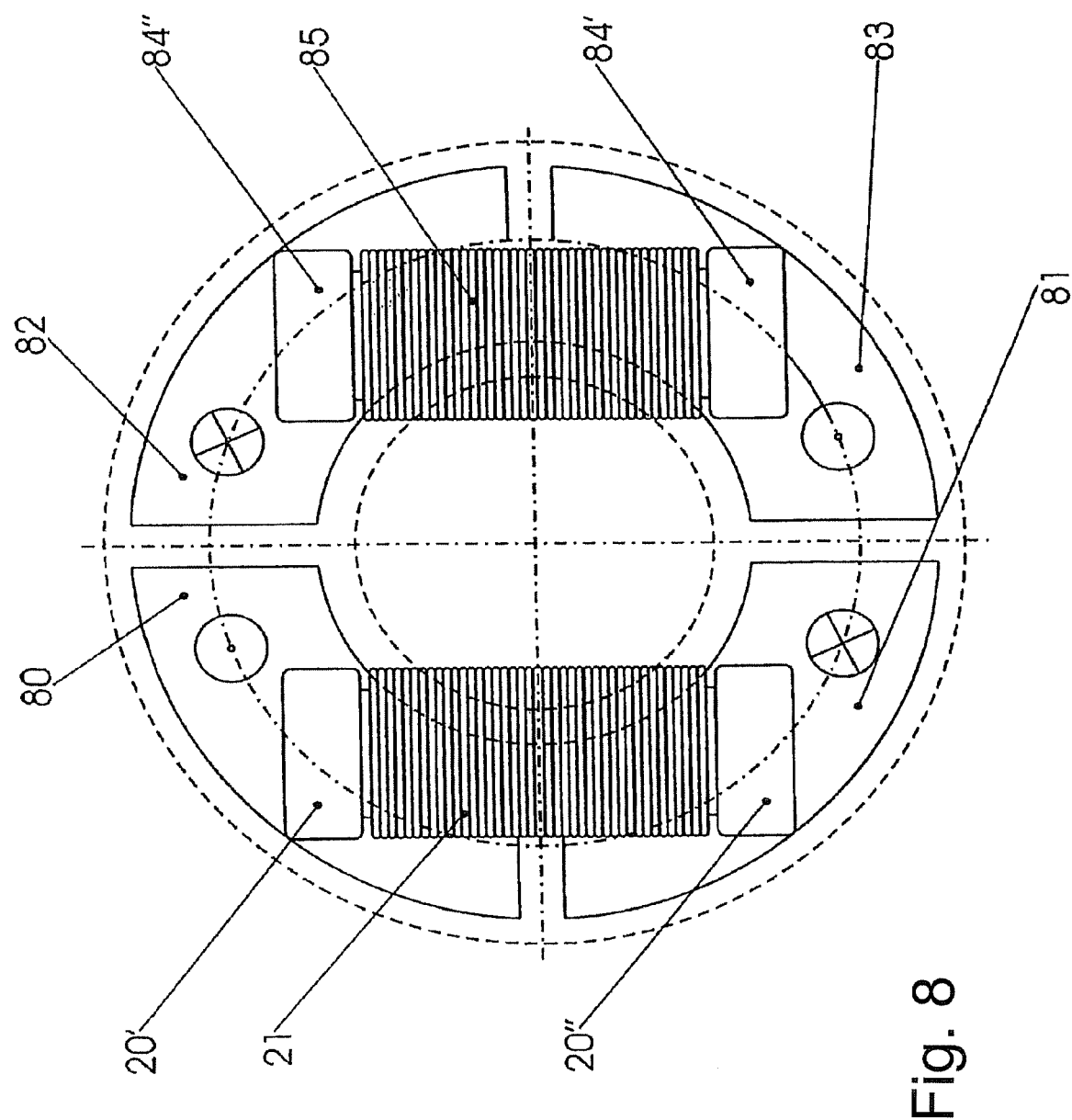
Figure 9:
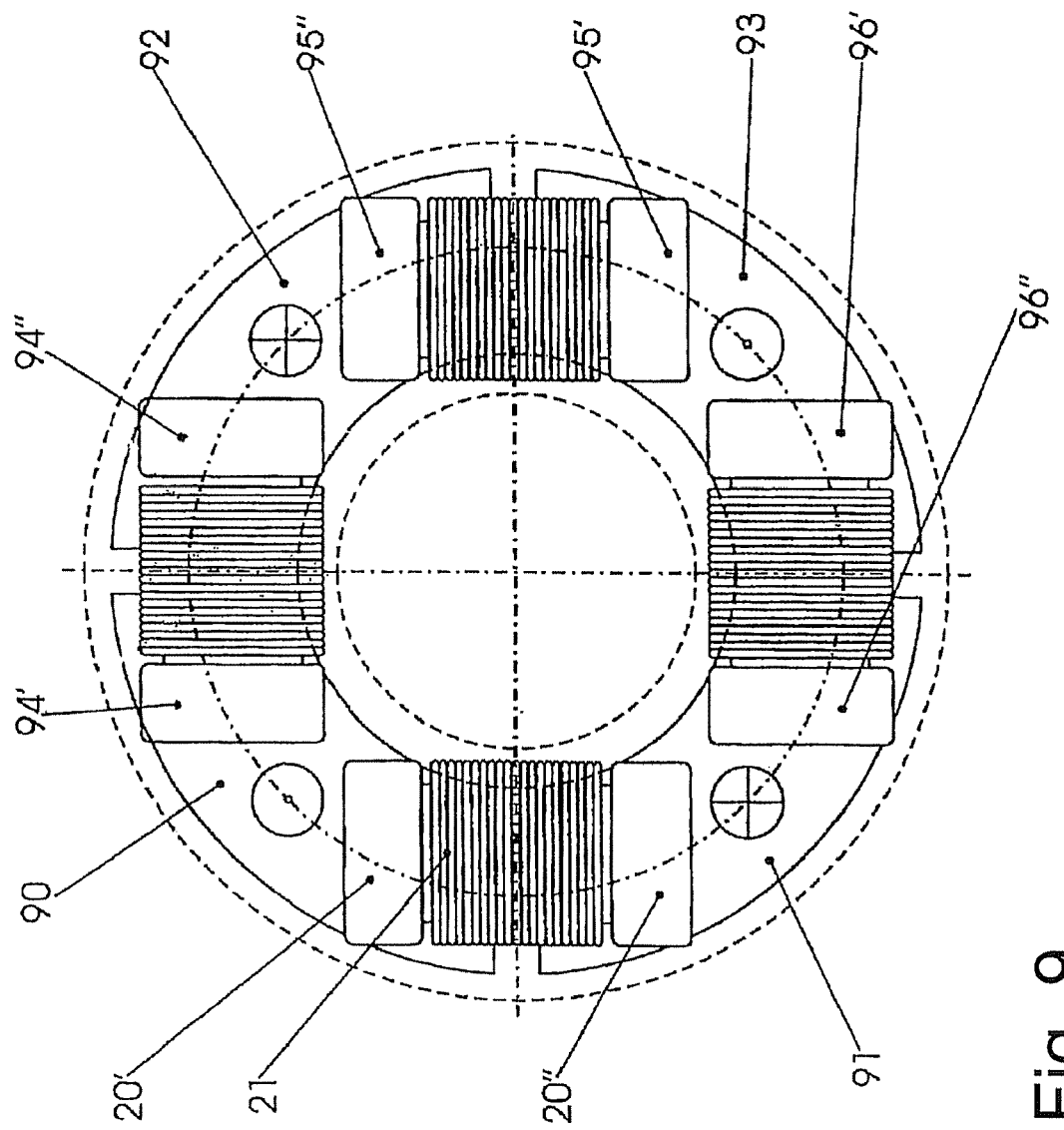

FIG. 1 shows a longitudinal section through a first preferred embodiment of the subject of the invention, FIG. 2a shows a section according to line II-II, developed in order to illustrate the magnetic field lines, FIG. 2b is a graphical representation illustrating the magnetic field strength corresponding to the magnetic field lines of FIG. 2a, FIG. 3 shows a variant of FIG. 1, FIG. 4 shows a longitudinal section through a second embodiment of the subject of the invention, FIG. 5 shows a view of a first variant of the embodiments of FIGS. 1 and 4, reduced, FIG. 6 shows a section taken through line AA shown in FIG. 5, FIG. 7 shows a view of a second variant of the embodiments of FIGS. 1 and 4, reduced, FIG. 8 shows a view of a third variant of the embodiments of FIGS. 1 and 4, reduced, and FIG. 9 shows a view of a fourth variant of the embodiments of FIGS. 1 and 4, reduced.

DETAILED DESCRIPTION

The following description is merely exemplary in nature and is not intended to limit the present disclosure, application, or uses.

Of the stationary part 1, FIG. 1 depicts only the collar which makes the brush contact for supplying the electrical current to the magnet coils. Torque transmission in the clutch takes place between a primary part 2 and a secondary part 8. The primary part 2 is seated fixedly in terms of rotation on a primary shaft 3 and forms a drum 5 with coupling teeth for the rotationally fixed, but displaceable reception of the primary lamellae 4. The primary part 2 itself consists of a material of very low magnetic permeability, and the primary lamellae 4 consist of a material of high magnetic permeability.

The secondary part 8 is screwed to the connecting flange 9 of a secondary shaft and receives the primary shaft 3 in bearings 10, 11. The secondary part 8 and primary part 2 are coaxial. The secondary part 8 consists of a front cover 12, of a rear cover 13 and of a circumferential wall 14 which on one side is welded to the front cover 12 and on the other side is connected to the rear cover 13 by means of an annular nut 15. The circumferential wall 14 has on the inside a coupling toothing 16, in which the secondary lamellae 17 are arranged fixedly in terms of rotation, but dispaceably.

The secondary part 8 has connected to it a first yoke 20 with a first coil 21 on the side of the front cover 12 and a second yoke 22 with a second coil 23 on the side of the rear cover 13. The yokes 20, 22 (see FIG. 2) are U-shaped, the coil 21, 23 loops around their middle part, and their legs 20', 20" extend parallel to the axis of rotation into the front and rear covers 12, 13 respectively. The two yokes there form feet 24, 25 which have a larger cross section than the legs of the yokes and which terminate in end faces 26, 27. The feet 24, 25 are connected fixedly to the front and rear covers 12, 13 respectively and naturally consist of a material of high magnetic permeability, whereas the entire secondary part 8, with the exception of the secondary lamellae 17, consists of a material of very low magnetic permeability.

A space 28 is thus formed, which contains alternately a number of primary lamellae 4 and secondary lamellae 17 and also contains a magnetorheological fluid. This space is delimited on the inside by the drum 5 of this primary part, on the outside by the circumferential wall 14 of the secondary part and at the front and rear by the inner walls of the front (12) and rear 13 cover and also the end faces 26, 27 of the yokes 20, 22. The part free of lamellae is filled with a magnetorheological fluid. Between the drum 5 of the primary part 2 and the secondary part 8 are provided seals 29 which close off the space 28 hermetically. Finally, for the protection of the magnet coils 21, 23, a corotating cladding plate 30 may also be provided.

FIGS. 2a and 2b illustrate a cylindrical section through the yokes 20, 22 according to II-II (FIG. 2a) and, above it, the magnetic field strengths (FIG. 2b). This section illustrates only the parts in which the magnetic field lines run and therefore those which consist of a material of high magnetic permeability. These are the yokes 20, 22 and the alternating lamellae 4, 17. What can be seen are the U-shape of the yokes 20, 22 with legs 20', 20", and legs 22', 22", respectively, and a thick closed curve 34 which indicates the direction and polarity of the magnetic field (counterclockwise). In the adjacent region on the left in the figure, the field direction 35 is clockwise, that is to say opposite to that of the yokes 20, 22. A plurality of field lines are also indicated here, so that a zone 36 in which the field strength has a zero crossing can be seen.

This can be seen more clearly in the curve 38 lying above it in FIG. 2b which illustrates the profile of the magnetic field strength along the circumference. FIG. 2 is general in as much as four yokes distributed on the circumference (as in FIG. 9) are provided. Only a single yoke or two yokes or their multiple could also be provided, in order, within the meaning of the objective of the invention, to achieve, overall, as high and as uniformly distributed a magnetic field strength as possible in the space 28 containing the lamellae.

FIG. 3 shows only the parts of high magnetic permeability, the right yoke 22 of FIG. 1 being indicated only by broken lines. To be precise, it is also possible, within the scope of the invention, to be satisfied with a first yoke 20 with a coil 21, or a plurality of these, and to design the second yoke 32 as a flat body or as a plate around which no magnet coil is looped. This plate 32 then extends in a circumferential direction over the feet 24 of both legs 20', 20" of the yoke 20. The magnetic flux is thereby also a closed curve again. In this case, an arrangement in which the plate 32 functions sometimes as a secondary yoke and thereafter sometimes as a first yoke is also conceivable.

In the variant of FIG. 4, identical or similar parts are given the reference symbols of FIG. 1 increased by 100. In contrast to FIG. 1, here, the yokes 120, 122 are mounted in the stationary part 101, that is to say do not rotate. There is therefore no longer any need for brush contacts. However, the feet 124, 125 of the yokes 120, 122 are separated from the yokes themselves by air gaps 132, 133 which can nevertheless be kept very small by virtue of the arrangement according to the invention. The feet 124, 125 are introduced into the side walls 112, 113 of the secondary part 108, so that the conditions in the space 128 are the same again as in FIG. 1. A further mounting 134 is provided between the stationary part 101 and the secondary part 108. With reference to the variant of FIG. 3, the foot 125 alone may serve as a yoke if the corresponding coil 123 is dispensed with.

FIG. 5 and FIG. 6 show the simplest design variant of the invention with only two coils, of which the coil 21 can be seen on the front side of the secondary part 8 and the second, behind the secondary part 8, cannot be seen, but is congruent with the first. The feet 24 of the yoke 20 are widened here in the circumferential direction and extend such that they form half of an annulus 50, 51. In this case, the symbols 52, 53 indicate the polarity of the magnetic field. 52 is the flux direction toward the observer and 53 the flux direction away from the observer.

It can also be seen in FIG. 6 that, in this case, the yoke 20 is not in one part, but consists of the two semiannular feet with their legs 20' and 20" which receive, as a middle part of the U, a straight bolt 54, around which, in turn, the coil 21 is looped. Despite all its simplicity, this embodiment has the disadvantage of generating a field of low homogeneity which exerts a tilting moment on the lamellae 4, 17. The directional arrows 52, 53 may be considered in this regard.

In the variant of FIG. 7, two magnet coils 21, 76 can be seen on the front side of the secondary part. On the rear side of the latter, either also two congruent coils or none are provided. See the variant of FIG. 3. Here, again, the legs 20' of the first coil 21 and 75' of the second coil 76 are connected to a semicircular foot 70; and the other legs 20", 75" of the two coils 21, 76 are connected to another semicircular foot 71. However, the two halves of the annulus do not touch one another with their end faces, for, of course, they have different polarities 72, 73. On the rear side of the secondary part 8, the same feet, which cannot be seen, are likewise designed congruently with those which can be seen. In this variant, the field distribution is even more homogeneous, but a tilting moment is still always exerted on the lamellae.

By increasing the number of coils, the individual coils may be of smaller design, which, in addition to the space saving, also entails a saving of weight, in particular of copper weight. What is critical for the magnetic field strength, of course, is not the length of the wire, but the number of turns. In the case of a smaller diameter of the coil and the same number of turns, the length of the wire will naturally be smaller.

In the variant of FIG. 8, on the visible side, there are two coils 21, 85, the yokes of which in each case again have two legs. Each of the legs 20', 20", 84', 84" is widened into a specific foot 80, 81, 82, 83, each of which forms a quarter of an annulus. The individual feet should again not touch one another. The arrows again indicate the polarity of the magnetic field. It can be seen that, in this arrangement, there is no longer a tilting moment exerted on the lamellae.

The variant of FIG. 9 has four small coils with their yokes 20, 94, 95, 96, of which in each case one leg with the same polarity (for example 20', 94') has a common foot 90 in the form of a quarter circle. Here, too, the annular sectors on the rear side of the secondary part 8 are congruent and with or without a magnet coil. In the case of the four magnet coils shown (there could, however, even be a higher multiple of two), the magnet coils are very small, so that the inside diameter of the feet 90, 92, 93, 91 is scarcely exceeded, with the result that more construction space is available for connecting the secondary shaft 9 (FIG. 1) or other drive train parts.

Overall, in all the variants described, with a given current intensity, a maximum magnetic filed strength is afforded over the entire clutch space, matching to practical requirements being possible by the choice of one of the many variants described or their combinations. In all instances, because of the arrangement of the magnet coils in front of and behind the lamellae of the clutch (and not inside or outside the latter), the construction space in the radial direction is also relatively small. This is particularly advantageous for use in the drive train of a motor vehicle.

What is claimed is:

1. A magnetorheological clutch comprising:
   a primary member and a secondary member forming a clutch cavity with at least one of said primary member and said secondary member being rotatably driven relative to the other thereof;
   a magnetorheological fluid disposed in said clutch cavity; and
   a coil assembly operable to generate a magnetic field in said clutch cavity, said magnetic field having a first polarity in a first direction and a second polarity in a second direction different from said first direction.

2. The magnetorheological clutch of claim 1 further including a primary lamellae fixed to said primary member and a secondary lamellae fixed to said secondary member, said first and second lamellae disposed within said clutch cavity.

3. The magnetorheological clutch of claim 2 wherein said coil assembly is fixed to one of said primary and secondary members and includes a first magnetic coil located on one side of said clutch cavity and a second magnetic coil located on an opposite side of said clutch cavity.

4. The magnetorheological clutch of claim 3 wherein said first magnetic coil is supported by a first yoke having a first end face and a second end face adjacent to said clutch cavity, wherein said first end face is polarized in said first direction and said second end face is polarized in said second direction.

5. The magnetorheological clutch of claim 3 wherein said primary member is driven relative to said secondary member and said coil assembly is fixed to said secondary member.

6. The magnetorheological clutch of claim 5 wherein said secondary member is rotatable relative to said primary member.

7. The magnetorheological clutch of claim 5 wherein said secondary member is non-rotatable relative to said primary member.

8. The magnetorheological clutch of claim 1 wherein said coil assembly is fixed to one of said primary and secondary members and includes a first magnetic coil located on one side of said clutch cavity and a second magnetic coil located on an opposite side of said clutch cavity.

9. The magnetorheological clutch of claim 8 wherein said first magnetic coil is supported by a first yoke having a first end face and a second end face adjacent to said clutch cavity, wherein said first end face is polarized in said first direction and said second end face is polarized in said second direction.

10. The magnetorheological clutch of claim 8 wherein said primary member is driven relative to said secondary member and said coil assembly is fixed to said secondary member.

11. The magnetorheological clutch of claim 10 wherein said secondary member is rotatable relative to said primary member.

12. The magnetorheological clutch of claim 10 wherein said secondary member is non-rotatable relative to said primary member.

13. The magnetorheological clutch of claim 1 wherein said primary and secondary members are aligned about a common rotary axis, and wherein said coil assembly includes a magnetic coil having a center axis obliquely oriented relative to said rotary axis.

14. A magnetorheological clutch comprising:
a primary member and a secondary member aligned along a common axis of rotation and forming a clutch cavity having axial ends and an outer diameter; and
at least one coil assembly disposed adjacent to one of said axial ends and radially inboard of said outer diameter, said at least one coil assembly including a magnet coil having a center axis noncoincident to said axis of rotation.

15. The magnetorheological clutch of claim 14 wherein said at least one coil assembly further includes a yoke supporting said magnet coil, said yoke having a plurality of end faces disposed adjacent to said clutch cavity and radially inboard relative said outer diameter.

16. The magnetorheological clutch of claim 14 wherein said at least one coil assembly comprises a first coil assembly disposed adjacent to a first axial end of said clutch cavity and a second coil assembly disposed adjacent to a second axial end of said clutch cavity.

17. The magnetorheological clutch of claim 14 further including a primary lamellae fixed to said primary member and a secondary lamellae fixed to said secondary member, said first and second lamellae disposed within said clutch cavity.

18. The magnetorheological clutch of claim 17 wherein said coil assembly is fixed to one of said primary and secondary members and includes a first magnetic coil located on one side of said clutch cavity and a second magnetic coil located on an opposite side of said clutch cavity.

19. The magnetorheological clutch of claim 18 wherein said first magnetic coil is supported by a first yoke having a first end face and a second end face adjacent to said clutch cavity, wherein said first end face is polarized in a first direction and said second end face is polarized in a second direction.

20. The magnetorheological clutch of claim 14 wherein said primary member is driven relative to said secondary member and said coil assembly is fixed to said secondary member.

21. The magnetorheological clutch of claim 20 wherein said secondary member is rotatable relative to said primary member.

22. The magnetorheological clutch of claim 20 wherein said secondary member is non-rotatable relative to said primary member.

23. A magnetorheological clutch comprising:
a primary part with primary lamellae and a secondary part with secondary lamellae which surrounds said primary part so as to define a space between said primary part and said secondary part which contains a magnetorheological fluid and in which said primary lamellae and secondary lamellae are disposed, and a regulatable magnetic field acting on said magnetorheological fluid, wherein a magnet coil is arranged in front or behind said lamellae in the axial direction and loops around a first yoke having two end faces adjacent to and parallel to the lamellae, a second yoke is provided on the side of said lamellae which faces away from said first yoke, and regions of said secondary part which lie inside and outside the lamellae in the radial direction consist of a material of low magnetic permeability.

24. The magnetorheological clutch as claimed in claim 23 wherein said second yoke is a flat body running in a circumferential direction and is surrounded by no magnet coil.

25. The magnetorheological clutch as claimed in claim 23 wherein said second yoke is surrounded by a second magnet coil.

26. The magnetorheological clutch as claimed in claim 23 wherein said first yoke is connected to a stationary part and is adjacent to an annular region of high permeability of said secondary part.

27. The magnetorheological clutch as claimed in claim 26 wherein said second yoke is also connected to said stationary part and is adjacent to an annular region of high permeability of said secondary part.

* * * * *